(12) United States Patent
D'Amato et al.

(10) Patent No.: US 9,330,161 B2
(45) Date of Patent: May 3, 2016

(54) CREATING GLOBAL AGGREGATED NAMESPACES FOR STORAGE MANAGEMENT

(71) Applicant: Microsoft Technology Licensing, LLC, Redmond, WA (US)

(72) Inventors: Andrea D'Amato, Kirkland, WA (US); Shiv Rajpal, Sammamish, WA (US); Gregory Robert Domzalski, Seattle, WA (US); Vyacheslav Kuznetsov, Sammamish, WA (US); Sarosh Cyrus Havewala, Kirkland, WA (US); Ankur Kasturiya, Issaquah, WA (US); Karan Mehra, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 13/861,997

(22) Filed: Apr. 12, 2013

(65) Prior Publication Data
US 2014/0310278 A1    Oct. 16, 2014

(51) Int. Cl.
*G06F 17/30* (2006.01)
*G06F 3/06* (2006.01)

(52) U.S. Cl.
CPC ........ *G06F 17/30598* (2013.01); *G06F 3/0604* (2013.01); *G06F 3/067* (2013.01); *G06F 3/0644* (2013.01); *G06F 17/30067* (2013.01)

(58) Field of Classification Search
CPC ................................................ G06F 17/30079
See application file for complete search history.

(56) References Cited

U.S. PATENT DOCUMENTS

| 6,546,415 | B1 |  | 4/2003 | Park |
| 6,687,701 | B2 |  | 2/2004 | Karamanolis et al. |
| 7,640,247 | B2 |  | 12/2009 | Pudipeddi |
| 8,225,057 | B1 | * | 7/2012 | Zheng et al. ................... 711/162 |
| 8,352,431 | B1 | * | 1/2013 | Protopopov ...... G06F 17/30082 707/640 |
| 2004/0172421 | A1 | * | 9/2004 | Saito et al. ..................... 707/200 |
| 2005/0125503 | A1 | * | 6/2005 | Iyengar et al. ................. 709/213 |
| 2006/0248294 | A1 | * | 11/2006 | Nedved et al. ................. 711/162 |
| 2010/0088352 | A1 | * | 4/2010 | Hendrickson et al. ........ 707/808 |
| 2010/0114889 | A1 |  | 5/2010 | Rabii et al. |
| 2011/0072126 | A1 |  | 3/2011 | Wujuan et al. |
| 2011/0137966 | A1 | * | 6/2011 | Srinivasan et al. ............ 707/828 |

OTHER PUBLICATIONS

"International Search Report & Written Opinion for PCT Patent Application No. PCT/US2013/058838", Mailed Date: Dec. 13, 2013, Filed Date: Sep. 10, 2013, 11 Pages.

* cited by examiner

*Primary Examiner* — Mohammad S Rostami
(74) *Attorney, Agent, or Firm* — Sunah Lee; Doug Barker; Micky Minhas

(57) ABSTRACT

Embodiments are directed to creating global, aggregated namespaces for storage management and to providing consistent namespaces in a distributed storage system. In one scenario, a computer system defines data storage objects for each data storage node. The data storage objects uniquely identify storage elements of the data storage nodes, where each data storage object includes various associated attributes. The computer system replicates the defined data storage objects and any associated attributes from a first data storage node to a second, different data storage node among the data storage nodes. As such, the defined data storage objects are visible from any node in the data storage nodes. The computer system also aggregates the defined data storage objects for each of the data storage nodes and creates a global, aggregated namespace that includes the aggregated data storage objects for each of the data storage nodes.

20 Claims, 6 Drawing Sheets

CREATING GLOBAL AGGREGATED NAMESPACES FOR STORAGE MANAGEMENT

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Software applications may also be designed to monitor and manage data storage systems. For example, applications may be designed to query nodes in a computer cluster to determine how much and what kind of data storage is currently available in the cluster. These determinations, however, may be complicated by different entities owning different parts of the cluster, or may show different results depending on where the query is initiated.

BRIEF SUMMARY

Embodiments described herein are directed to creating global, aggregated namespaces for storage management and to providing consistent namespaces in a distributed storage system. In one embodiment, a computer system defines data storage objects for each data storage node. The data storage objects uniquely identify storage elements of the data storage nodes, where each data storage object includes various associated attributes. The computer system replicates the defined data storage objects and any associated attributes from a first data storage node to a second, different data storage node among the data storage nodes. As such, the defined data storage objects are visible from any node in the data storage nodes. The computer system also aggregates the defined data storage objects for each of the data storage nodes and creates a global, aggregated namespace that includes the aggregated data storage objects for each of the data storage nodes.

In another embodiment, a computer system receives an input from a user requesting information regarding data storage objects in a distributed data storage system. The computer system then determines that the user input was received from a computing node that is internal to the data storage system and aggregates node-specific data storage objects of the computing node. The computer system further aggregates global data storage objects of the distributed data storage system and creates a global, unified namespace for the distributed data storage system. The global, unified namespace includes the aggregated node-specific data storage objects and the aggregated global data storage objects.

In yet another embodiment, a computer system receives an input from a user requesting information regarding data storage objects in a distributed data storage system. The computer system determines that the user input was received from a computing node that is external to the data storage system, aggregates global objects of the distributed data storage system and creates a global, unified namespace for the distributed data storage system, which includes the aggregated global objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
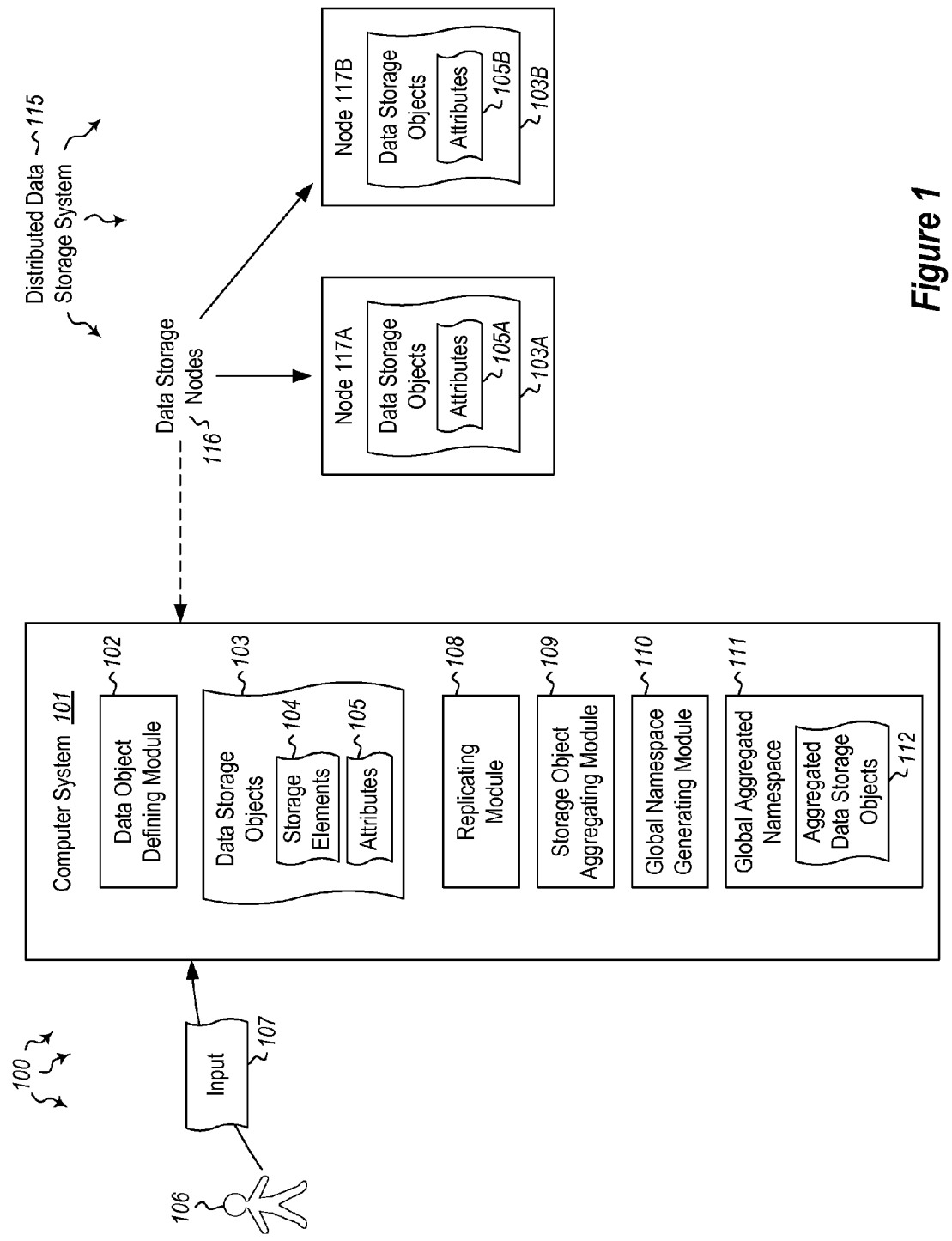
FIG. 1 illustrates a computer architecture in which embodiments described herein may operate including creating global, aggregated namespaces for storage management.

Embodiments described herein are directed to creating global, aggregated namespaces for storage management and to providing consistent namespaces in a distributed storage system. In one embodiment, a computer system defines data storage objects for each data storage node. The data storage objects uniquely identify storage elements of the data storage nodes, where each data storage object includes various associated attributes. The computer system replicates the defined data storage objects and any associated attributes from a first data storage node to a second, different data storage node among the data storage nodes. As such, the defined data storage objects are visible from any node in the data storage nodes. The computer system also aggregates the defined data storage objects for each of the data storage nodes and creates a global, aggregated namespace that includes the aggregated data storage objects for each of the data storage nodes.

In another embodiment, a computer system receives an input from a user requesting information regarding data storage objects in a distributed data storage system. The computer system then determines that the user input was received from a computing node that is internal to the data storage system and aggregates node-specific data storage objects of the computing node. The computer system further aggregates global data storage objects of the distributed data storage system and creates a global, unified namespace for the distributed data storage system. The global, unified namespace includes the aggregated node-specific data storage objects and the aggregated global data storage objects. In some cases, it should be noted, the computer system may receive an input that is internal to the distributed data storage system, where the global, unified namespace includes the aggregated global data storage objects as well as node-specific data storage objects that are specific to the node at which the input is received. As such, this node-specific view is not aggregated across all the nodes, but is scoped only to the node-specific objects made available on that node.

In yet another embodiment, a computer system receives an input from a user requesting information regarding data storage objects in a distributed data storage system. The computer system determines that the user input was received from a computing node that is external to the data storage system, aggregates global objects of the distributed data storage system and creates a global, unified namespace for the distributed data storage system, which includes the aggregated global objects.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, the data object defining module 102 defines data storage objects 103. These data storage objects have storage elements 104 and attributes 105. The attributes may indicate, for example, that the data storage object is stored locally or is distributed over multiple data storage nodes 116. The data storage nodes 116 may be any type of local or distributed storage nodes, and may comprise computing systems, hard drives, optical drives, storage area networks (SANs) or other storage devices. Thus, in some cases, computer system 101 may include a storage node or may, itself, be a storage node 116 that is among the storage nodes of distributed data storage system 115. The distributed data storage system 115 may include substantially any number of data storage nodes 116, each data storage node including substantially any number of data storage objects.

Figure 5A:
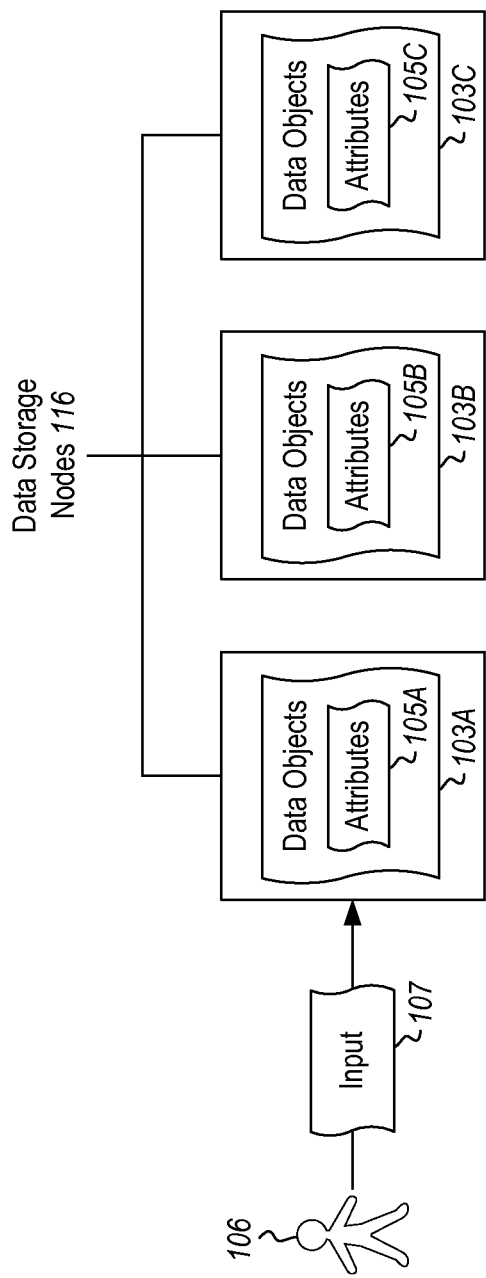
FIG. 5A illustrates an embodiment in which a request is received from an internal data storage node.
Figure 5B:
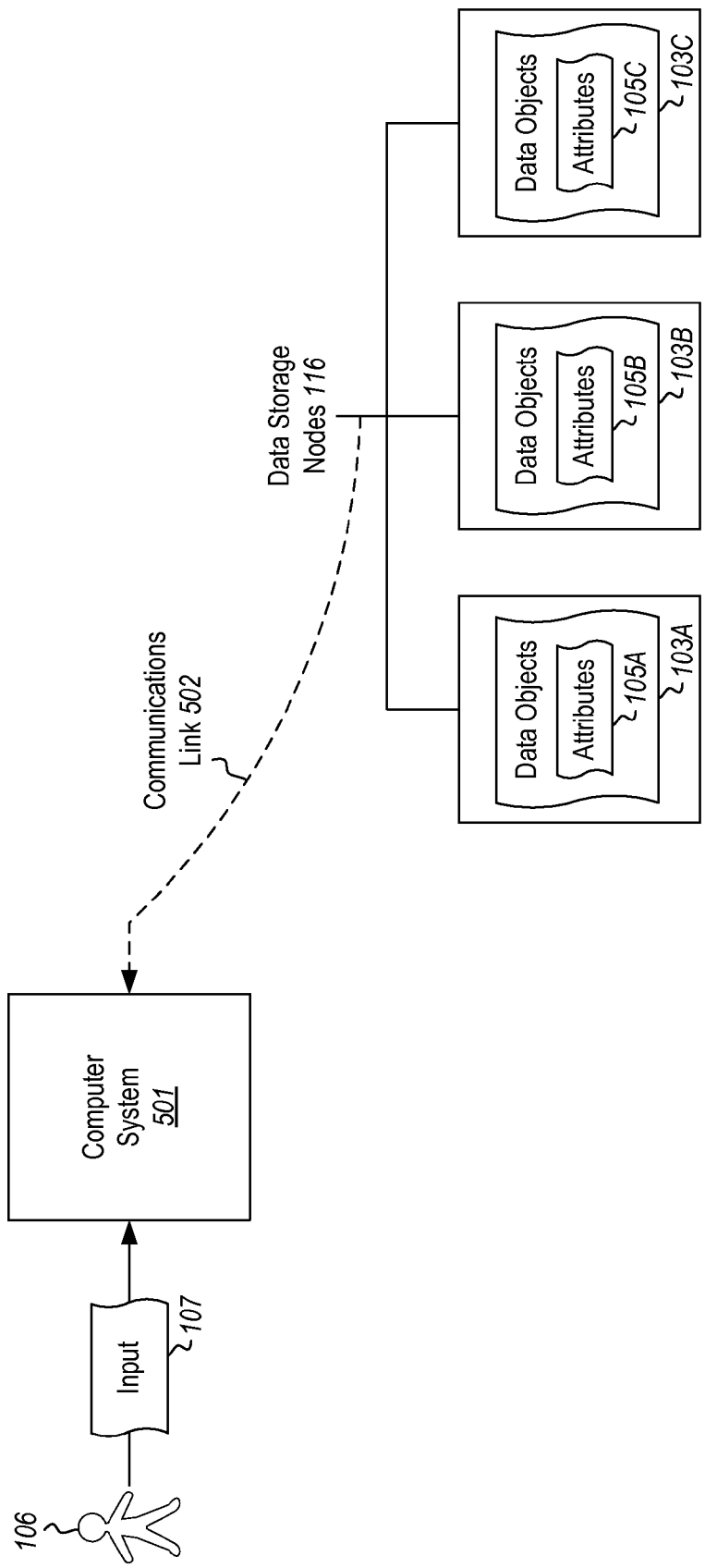
FIG. 5B illustrates an embodiment in which a request is received from outside the data storage nodes.

The data storage objects 103 defined by module 102 may be replicated by replicating module 108. These replicated data storage objects may be sent to other data storage nodes 116 within the distributed data storage system 115. As such, at least in some embodiments, each data storage node (e.g. 117A, 117B, etc.) will have an indication of the defined data storage objects (e.g. 103A & 103B, along with corresponding attributes 105A & 105B, respectively) that are in the distributed data storage system 115. Thus, each data storage node 116 has an accurate view of the other data storage nodes and data storage objects 103 within the distributed data storage system 115. Moreover, any queries 107 received from user 106 or from another user will be answered with a consistent reply, regardless of whether the query is received at a node within the data storage nodes 116 (i.e. within a cluster of nodes, as shown in FIG. 5A) or at a node that is external to the cluster of data storage nodes (as shown in FIG. 5B).

The accurate and consistent view of data storage nodes across the cluster is provided (at least in part) by the global, aggregated namespace 111. The storage object aggregating module 109 may aggregate the storage objects of each of the data storage nodes 116, and the global namespace generating module 110 may generate a global, aggregated namespace 111 that includes each of the aggregated data storage objects. Because the global, aggregated namespace 111 includes and/or is aware of each of the aggregated data storage objects in each of the data storage nodes in the distributed data storage system 115, the global, aggregated namespace 111 can provide a consistent view of the data storage objects across the system, regardless of whether queries are received from within the system or external to the system. These concepts will be explained further below with regard to methods 200, 300 and 400 of FIGS. 2, 3 and 4, respectively.

Figure 2:
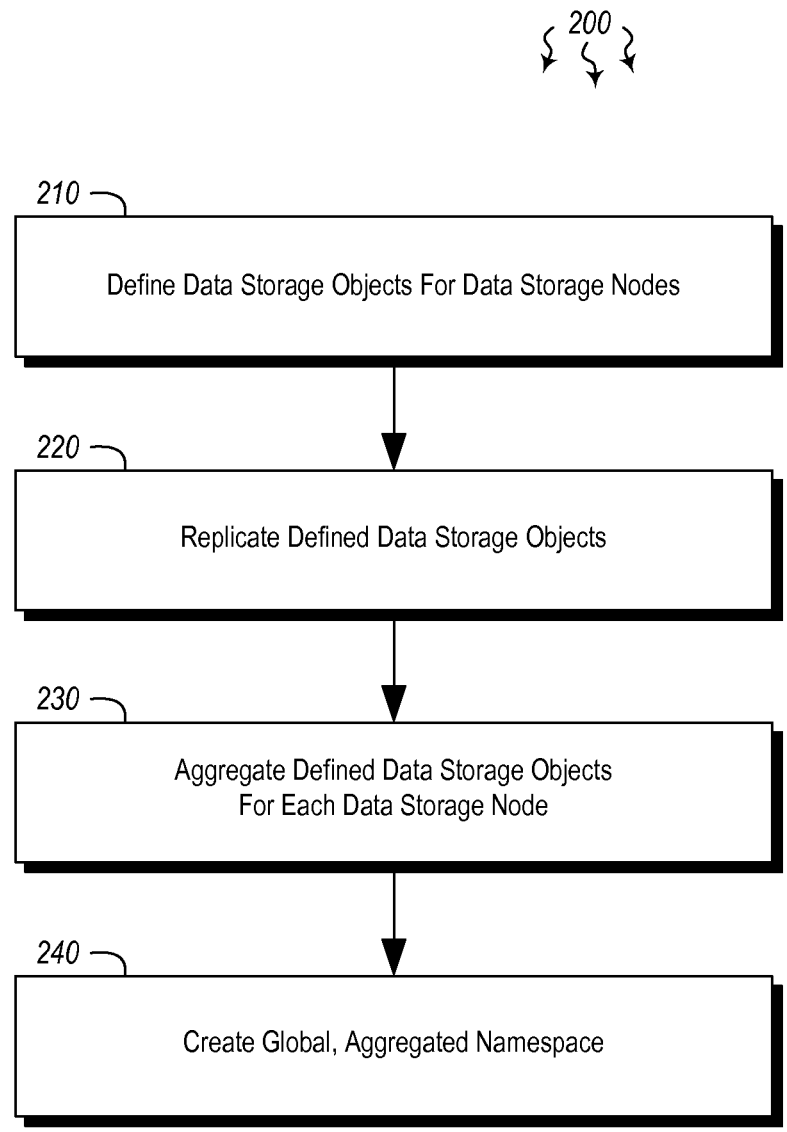
FIG. 2 illustrates a flowchart of an example method for creating global, aggregated namespaces for storage management.
Figure 3:
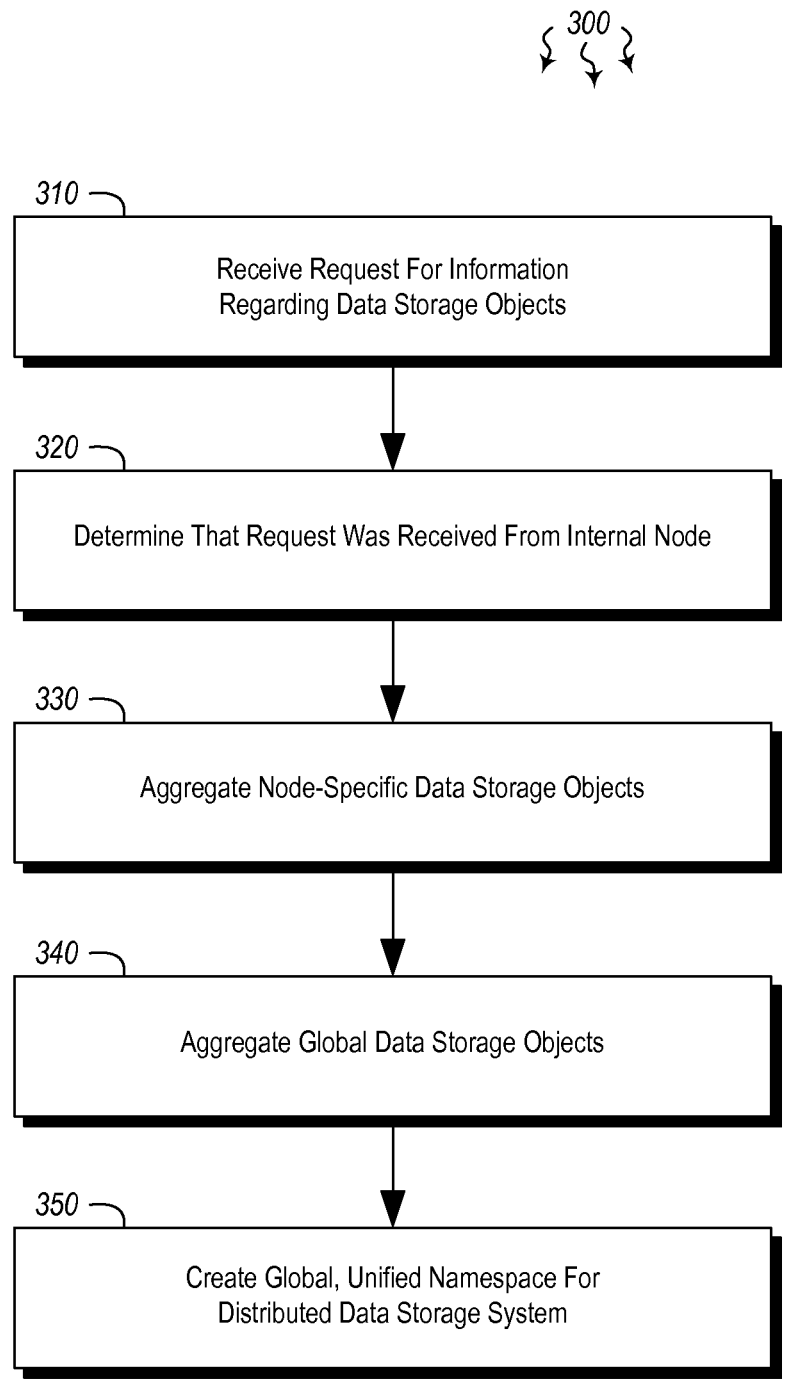
FIG. 3 illustrates a flowchart of an example method for providing consistent namespaces in a distributed storage system.
Figure 4:
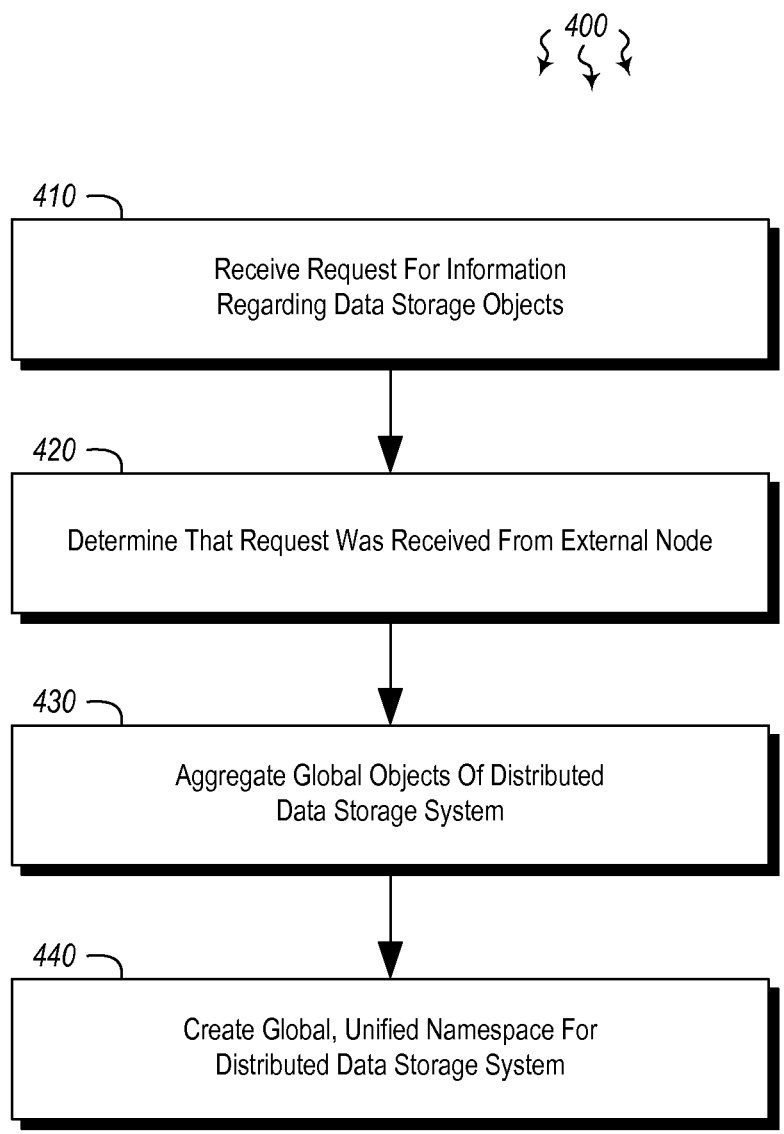
FIG. 4 illustrates a flowchart of an alternative example method for providing consistent namespaces in a distributed storage system.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for creating global, aggregated namespaces for storage management. The method 200 will now be described with frequent reference to the components and data of environment 100.

Method 200 includes an act of defining one or more data storage objects for each of a plurality of data storage nodes, the objects uniquely identifying one or more storage elements of the data storage nodes, each data storage object including one or more associated attributes (act 210). For example, data object defining module 102 may defines data storage objects 103 for each of data storage nodes 116. The data storage objects uniquely identify storage elements 104 of the data storage nodes such as hardware elements including hard drives. The data storage objects 103 also include attributes 105. These attributes may indicate, for example, whether the data storage is local or distributed. For instance, the storage objects may include hard disks, and the hard disks may be part of a data storage array. Such a data storage array may comprise or be part of the distributed data storage system 115.

Method 200 further includes an act of replicating the defined data storage objects and any associated attributes from a first data storage node to a second, different data storage node among the plurality of data storage nodes, such that the defined data storage objects are visible from any node in the plurality of data storage nodes (act 220). The replicating module 108 of computer system 101 may replicate the data storage objects 103 defined by module 102. The replicating module will replicate any corresponding storage elements 104 and/or attributes 105 along with the data storage objects. In one example, the data storage objects 103 are replicated from computer system 101 (which, at least in some embodiments, is part of the data storage nodes 116 of distributed data storage system 115) to nodes 117A and 117B. These replicated data objects include information about the data storage objects and nodes that are within the distributed data storage system 115 and, as such, can ensure that each data storage object is visible from each data storage node in the system.

The storage object aggregating module 109 of computer system 101 then aggregates the defined data storage objects 103 for each of the plurality of data storage nodes 116 (act 230). The aggregation combines the data storage objects 103 of the distributed data storage system 115 and, as such, is aware of each data storage object in the system. The global namespace generating module 110 can then create a global, aggregated namespace 111 that includes the aggregated data storage objects 112 for each of the plurality of data storage nodes 116 (act 240).

The global, aggregated namespace allows operations to be performed vis a vie the data storage objects. For example, management actions such as status queries or requests to enumerate clustered or clusterable storage may be performed using the global, aggregated namespace. The global, aggregated namespace 111 can provide a consistent and aggregated view of the clustered/clusterable storage elements in a clustered storage environment. This consistent view will be shown whether viewed from a node in the cluster, or from a node not part of the cluster. The global, aggregated namespace further provides for a local view that details node-specific storage resources.

In some embodiments, two general types of subsystems may be provided: clustered subsystems and standalone subsystems. In a clustered environment, a provider may create a cluster-wide subsystem. This subsystem would enable any operation to be executed on any cluster node and produce a consistent, aggregated view of the clustered and/or clusterable storage elements in the cluster subsystem. A standalone subsystem would expose the local, non-clusterable and non-shared storage resources of each specific node. If the user 106 is connected to the clustered subsystem, the aggregated view of the storage elements will be presented. This will be consistent from any node in the cluster or from a management node outside of the cluster. To see local storage elements, the user may connect to the local subsystem.

The global, aggregated namespace 111 allows management actions to be performed on the data storage objects and/or data storage nodes 116 of the distributed data storage system 115. The management actions may include determining on which data storage nodes 116 the management action is to be performed. Any function calls that correspond to the management actions are routed to the determined data storage node using the global, aggregated namespace 111. Thus, for example, if user 106 were to perform a management action, the global namespace would be used to determine ownership of the appropriate data storage object, and the function call would be routed to the owner of that object. As mentioned above, the management actions may include data queries, enumeration queries, storage device operations (such as partitioning) or other actions.

In cases where function calls are to be sent to a specified data storage node (e.g. node 117A), the computer system 101 may determine that delivery for at least one of the function calls has failed (for whatever reason). The computer system 101 may then reroute the failed function call to at least one other data storage node or data storage object among the nodes and objects of the distributed data storage system 115.

In yet another embodiment, performing a management action may include monitoring the aggregated data storage objects 112 using the global, aggregated namespace 111. The aggregated data storage objects may be monitored from any data storage node 116, or from a remote computer system that is external to the data storage nodes 116 (e.g. as shown in FIG. 5B). In one example, a data storage object (e.g. a hard disk) mounted on node 117A may fire an event when it reaches a threshold of used space. This event may be routed to node 117B or computer system 101, into which a management tool is remotely connected. The management tool may thus provide the ability to monitor the data storage object (i.e. the disk) from any node in the distributed data storage system 115. This management tool may also be used to diagnose any problems detected during the monitoring.

It should also be noted that the global, aggregated namespace 111 maintains the aggregated data storage objects 112 despite physical data storage device failures. While physical machines in the distributed data storage system 115 may fail and/or change, the global data storage objects 103 stay alive in the global, aggregated namespace. The global namespace is thus resilient and robust against failures, such that users see a coherent, global namespace 11 for the aggregated data storage objects 112.

In order to facilitate management actions using the global namespace, a user interface (UI) may be provided that allows users to enter intent-based commands. The intent-based commands may be entered using the UI and may be carried out using the global, aggregated namespace. The user can thus describe their intent (i.e. what they want to happen (e.g. I need 50 TB of space in 3 fault domains)) and the management tool will determine which data storage nodes 116 should be used to provide the 50 TB of space. Many other intent-based commands can be used, and the above example is merely one instance of the potential intent-based commands.

FIG. 3 illustrates a flowchart of a method 300 for providing consistent namespaces in a distributed storage system. The method 300 will now be described with frequent reference to the components and data of environment 100 of FIG. 1 and FIG. 5A.

Method 300 includes an act of receiving an input from a user requesting one or more portions of information regarding data storage objects in a distributed data storage system (act 310). For example, as shown in FIG. 5A, user 106 may send input 107 requesting information regarding data storage objects (e.g. hard drives) in distributed data storage system 115. The computer system 101 determines that the user input was received from a computing node that is internal to the data storage system (act 320). Thus, as shown in FIG. 5A, a user using one of the data storage nodes 116 enters the data request at that node. The storage object aggregating module 109 aggregates node-specific data storage objects of the computing node (act 330). These node-specific data storage objects are local to the data storage node and, in some cases, may be known only to that node. The storage object aggregating module 109 may further aggregate global data storage objects 103 of the distributed data storage system (act 340). Then, using both the node-specific and the global data storage objects, the global namespace generating module 110 may generate a global, unified namespace 111 for the distributed data storage system 115. The global, unified namespace 111 includes both the aggregated node-specific data storage objects and the aggregated global data storage objects (act 350).

In some cases, as mentioned above, the computer system 101 may receive an input 107 that is internal to the distributed data storage system (e.g. received at one of nodes 116 of FIG. 5A). In such cases, the global, unified namespace includes the aggregated global data storage objects (e.g. 103A-C) as well as node-specific data storage objects that are specific to the node at which the input is received. As such, this node-specific view is not aggregated across all the nodes, but is scoped only to the node-specific objects made available on that node (i.e. the node at which the internal input was received).

The global, unified namespace for the distributed data storage system is thus consistent for each node of the distributed data storage system 115, regardless of which internal computing node the user input was received from. In some cases, a single application programming interface (API) may be used to manage local resources on the internal computing node as well as global resources on the distributed data storage system. The data storage objects may be automatically generated and aggregated into the global, unified namespace for data storage devices that are later added to the distributed data storage system.

FIG. 4 illustrates a flowchart of a method 400 for providing consistent namespaces in a distributed storage system. The method 400 will now be described with frequent reference to the components and data of environment 100 of FIG. 1, and FIG. 5B.

Method 400 includes an act of receiving an input from a user requesting one or more portions of information regarding data storage objects in a distributed data storage system (act 410). For example, as shown in FIG. 5B, user 106 may provide input 107 at computer system 501. The computer system 501 is not a part of data storage nodes 116. As such, the computer system 501 communicates with the data storage nodes 116 using communications link 502. The request received from the user may thus be forwarded to one or more of the data storage nodes 116 in the distributed data storage system 115. The receiving node(s) may determine that the user input was received from a computing node that is external to the data storage system (act 420) (e.g. computing node 501). The receiving node(s) may then aggregate one or more global objects of the distributed data storage system 115 (act 430) and create a global, unified namespace 111 for the distributed data storage system, where the unified namespace includes the aggregated global objects 112 (act 440). For example As with the example shown in FIG. 5A, in FIG. 5B the user is presented with a globally consistent view, regardless of where the request was received from. Still further, the global, unified namespace 111 for the distributed data storage system is consistent for each node of the distributed data storage system, regardless of which external computing node the user input was received from. The user may be presented with both a node-specific view for the computing node from which the user input was received and an aggregated, global view of the data storage objects in the distributed data storage system 115. In this manner, a user may be able to perform queries within or outside of the data storage cluster 116, and may receive consistent views of data storage objects stored on those nodes.

Accordingly, methods, systems and computer program products are provided which create global, aggregated namespaces for storage management. Moreover, methods, systems and computer program products are provided which provide consistent namespaces in a distributed storage system, both from inside and outside the cluster of data storage nodes.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system, comprising:
one or more processors; and
one or more computer-readable storage media having stored thereon computer-executable instructions representing one or more modules that are executable by the one or more processors to create a global, aggregated namespace for storage management in a distributed data storage system comprising a plurality of data storage nodes, the one or more modules being configured to perform at least the following:
define a plurality of data storage objects corresponding to and defining a plurality of hardware storage elements of the plurality of data storage nodes, each data storage object defining at least one hardware storage element of the plurality of hardware storage elements that is made available by at least one of the plurality of data storage nodes, and comprising:
a unique identification of the at least one hardware storage element that is being defined by the data storage object; and
one or more associated attributes that identify whether the at least one hardware storage element is local to a single node of the plurality of data storage nodes, or distributed over two or more of the plurality of data storage nodes;
replicate the plurality of data storage objects across the plurality of data storage nodes, such that the plurality data storage objects, and the plurality of hardware storage elements that are defined by the plurality data storage objects, are visible from any node in the plurality of data storage nodes; and
generate an aggregate view of the plurality of data storage objects, including creating a global, aggregated namespace that includes each of the plurality of data storage objects that are replicated across the plurality of data storage nodes, along with the plurality of hardware storage elements that are defined by the plurality data storage objects.

2. The computer system of claim 1, wherein the one or more modules are also configured to perform a management action using the global, aggregated namespace.

3. The computer system of claim 2, wherein when performing the management action, the one or more modules are configured to determine on which one or more data storage nodes among the plurality of data storage nodes the management action is to be performed.

4. The computer system of claim 3, wherein the one or more modules are configured to route function calls corresponding to the management action to the determined one or more data storage nodes.

5. The computer system of claim 4, wherein when routing function calls corresponding to the management action to the determined one or more data storage nodes, the one or more modules are also configured to:
determine that delivery for at least one of the function calls sent to the determined one or more data storage nodes has failed; and
re-route the at least one function call to at least one other data storage object among the aggregated data storage objects.

6. The computer system of claim 2, wherein the management action comprises monitoring the plurality of data storage objects using the global, aggregated namespace.

7. The computer system of claim 6, wherein when monitoring the plurality of data storage objects, the one or more modules are configured to monitor the plurality of data storage objects from any data storage node of the plurality of data storage nodes.

8. The computer system of claim 6, wherein when monitoring the plurality of data storage objects, the one or more modules are configured to diagnose one or more problems detected during the monitoring.

9. The computer system of claim 1, wherein the one or more hardware storage elements comprise at least one of: one or more hard disks that are part of a data storage array, one or more storage area networks, and one or more optical drives.

10. The computer system of claim 1, wherein the global, aggregated namespace is resilient, such that users see a coherent, global namespace for the plurality of data storage objects.

11. The computer system of claim 10, wherein the global, aggregated namespace maintains the plurality of data storage objects despite physical data storage device failures.

12. The computer system of claim 1, wherein the one or more modules are also configured to provide a user interface that allows users to enter intent-based commands, the intent-based commands being performed using the global, aggregated namespace.

13. A computer system, comprising:
one or more processors; and
one or more computer-readable storage media having stored thereon computer-executable instructions representing one or more modules that are executable by the one or more processors to provide a consistent namespace in a distributed data storage system comprising a plurality of data storage nodes, the one or more modules being configured to perform at least the following:
receive an input from a user, the input requesting one or more portions of information regarding a plurality of data storage objects corresponding to and defining a plurality of hardware storage elements of the plurality of data storage nodes, each data storage object defining at least one hardware storage element of the plurality of hardware storage elements that is made available by at least one of the plurality of data storage nodes, and comprising:
a unique identification of the at least one hardware storage element that is being defined by the data storage object; and
one or more associated attributes that identify whether the at least one hardware storage element is local to a single node of the plurality of data storage nodes, or distributed over two or more of the plurality of data storage nodes;
determine that the user input was received at a particular data storage node of the plurality of data storage nodes that is internal to the distributed data storage system;
aggregate one or more node-specific data storage objects of the plurality of data storage objects that define one or more of the plurality of hardware storage elements that is made available by the particular data storage node;
aggregate one or more global data storage objects of the plurality of data storage objects for the distributed data storage system; and
create a global, unified namespace for the distributed data storage system, the global, unified namespace including the aggregated node-specific data storage objects and the aggregated global data storage objects.

14. The computer system of claim 13, wherein the global, unified namespace for the distributed data storage system is consistent for each node of the distributed data storage system, regardless of which internal data storage node from which the user input was received.

15. The computer system of claim 13, wherein a single application programming interface (API) is used to manage local resources on the internal particular data storage node and one or more global resources on the distributed data storage system.

16. The computer system of claim 13, wherein data storage objects are automatically generated and aggregated into the global, unified namespace for data storage devices that are added to the distributed data storage system.

17. The computer system of claim 13, wherein the global, unified namespace includes the aggregated global data storage objects as well as node-specific data storage objects that are specific to the node at which the input was received.

18. A computer system, comprising:
one or more processors; and
one or more computer-readable storage media having stored thereon computer-executable instructions representing one or more modules that are executable by the one or more processors to provide a consistent namespace in a distributed data storage system comprising a plurality of data storage nodes, the one or more modules being configured to perform at least the following:
receive an input from a user, the input requesting one or more portions of information regarding a plurality of data storage objects corresponding to and defining a plurality of hardware storage elements of the plurality of data storage nodes, each data storage object defining at least one hardware storage element of the plurality of hardware storage elements that is made available by at least one of the plurality of data storage nodes, and comprising:
a unique identification of the at least one hardware storage element that is being defined by the data storage object; and
one or more associated attributes that identify whether the at least one hardware storage element is local to a single node of the plurality of data storage nodes, or distributed over two or more of the plurality of data storage nodes;
determine that the user input was received at a particular data storage node of the plurality of data storage nodes that is external to the distributed data storage system;
aggregate one or more global data storage objects of the plurality of data storage objects for the distributed data storage system; and
create a global, unified namespace for the distributed data storage system, the global, unified namespace including the aggregated global data storage objects.

19. The computer system of claim 18, wherein the global, unified namespace for the distributed data storage system is consistent for each node of the distributed data storage system, regardless of which external data storage node from which the user input was received.

20. The computer system of claim 18, wherein the one or more modules are also configured to present both a node-specific view for the data storage node from which the user input was received and an aggregated, global view of the data storage objects in the distributed data storage system.

* * * * *